United States Patent [19]

Doemens

[11] 4,238,780
[45] Dec. 9, 1980

[54] PROCESS AND AN APPARATUS FOR AUTOMATICALLY RECOGNIZING THE POSITION OF SEMICONDUCTOR ELEMENTS

[75] Inventor: Guenter Doemens, Holzkirchen, Fed. Rep. of Germany

[73] Assignee: Siemens Aktiengesellschaft, Berlin & Munich, Fed. Rep. of Germany

[21] Appl. No.: 26,038

[22] Filed: Apr. 2, 1979

[30] Foreign Application Priority Data

Apr. 14, 1978 [DE] Fed. Rep. of Germany ....... 2816324
Feb. 28, 1979 [DE] Fed. Rep. of Germany ....... 2907774

[51] Int. Cl.³ .................... G06F 15/46; H05K 13/00
[52] U.S. Cl. .................. 340/146.3 H; 250/561; 356/375; 358/101; 364/490; 364/559
[58] Field of Search ............. 340/146.3 H, 146.3 AE, 340/146.3 AC; 356/375, 398; 250/561; 358/101; 364/468, 488, 489, 490, 491, 559, 560

[56] References Cited

U.S. PATENT DOCUMENTS

| | | | |
|---|---|---|---|
| 3,565,532 | 2/1971 | Heitmann et al. | 356/375 |
| 3,670,153 | 6/1972 | Rempert et al. | 364/559 |
| 3,814,845 | 6/1974 | Hurlbrink et al. | 358/101 |
| 3,898,617 | 8/1975 | Kashioka et al. | 340/146.3 H |
| 3,899,634 | 8/1975 | Montone et al. | 358/101 |
| 3,903,363 | 9/1975 | Montone et al. | 358/101 |
| 3,907,439 | 9/1975 | Zanoni | 356/375 |
| 3,955,072 | 5/1976 | Johannsmeier et al. | 364/490 |
| 4,021,778 | 5/1977 | Ueda et al. | 340/146.3 AC |
| 4,057,845 | 11/1977 | Ejiri et al. | 340/146.3H |
| 4,091,394 | 5/1978 | Kashioka et al. | 340/146.3 H |
| 4,103,998 | 8/1978 | Nakazawa et al. | 356/398 |
| 4,105,925 | 8/1978 | Rossol et al. | 250/561 |
| 4,115,761 | 9/1978 | Ueda et al. | 340/146.3 AC |
| 4,115,762 | 9/1978 | Akiyama et al. | 340/146.3 H |
| 4,163,212 | 7/1979 | Buerger et al. | 340/146.3 H |
| 4,186,412 | 1/1980 | Arimura | 358/101 |

*Primary Examiner*—Leo H. Boudreau
*Attorney, Agent, or Firm*—Hill, Van Santen, Steadman, Chiara & Simpson

[57] ABSTRACT

The position of semiconductor elements is recognized automatically by opto-electronic, non-contact techniques. Recognition of the position of the semiconductor elements, such as integrated circuits, is largely independent of pattern and surface properties, in particular for adjustment purposes in automatic wire assembly and in the transfer of semiconductor elements to automatic alloying/adhesive equipment. The positions of the semiconductor elements are determined via a rectilinear cut edge or system edge by means of a row-by-row scanning which leads from the surroundings of an element and moves across the element, with the rows running parallel or virtually parallel to the direction of the rectilinear edge. The instantaneous intensities of the brightness values are integrated row-wise or row-section-wise, the resulting values are stored and the difference of the results of consecutive rows is formed. Then, only the polarity which corresponds to the investigated edge is used for further analysis. The result is weighted with a factor which corresponds to the roughness of the particular position in the image. The differences in a rough zone are distinctly weakened and differences in a smooth zone are distinctly emphasized, and by means of an additional electronic width evaluation, sharp-edged lines are emphasized in relation to wide junctions so that, on this basis, by means of row counting, a signal for correcting the position of the chip is formed and is output in order to correct the position.

33 Claims, 16 Drawing Figures

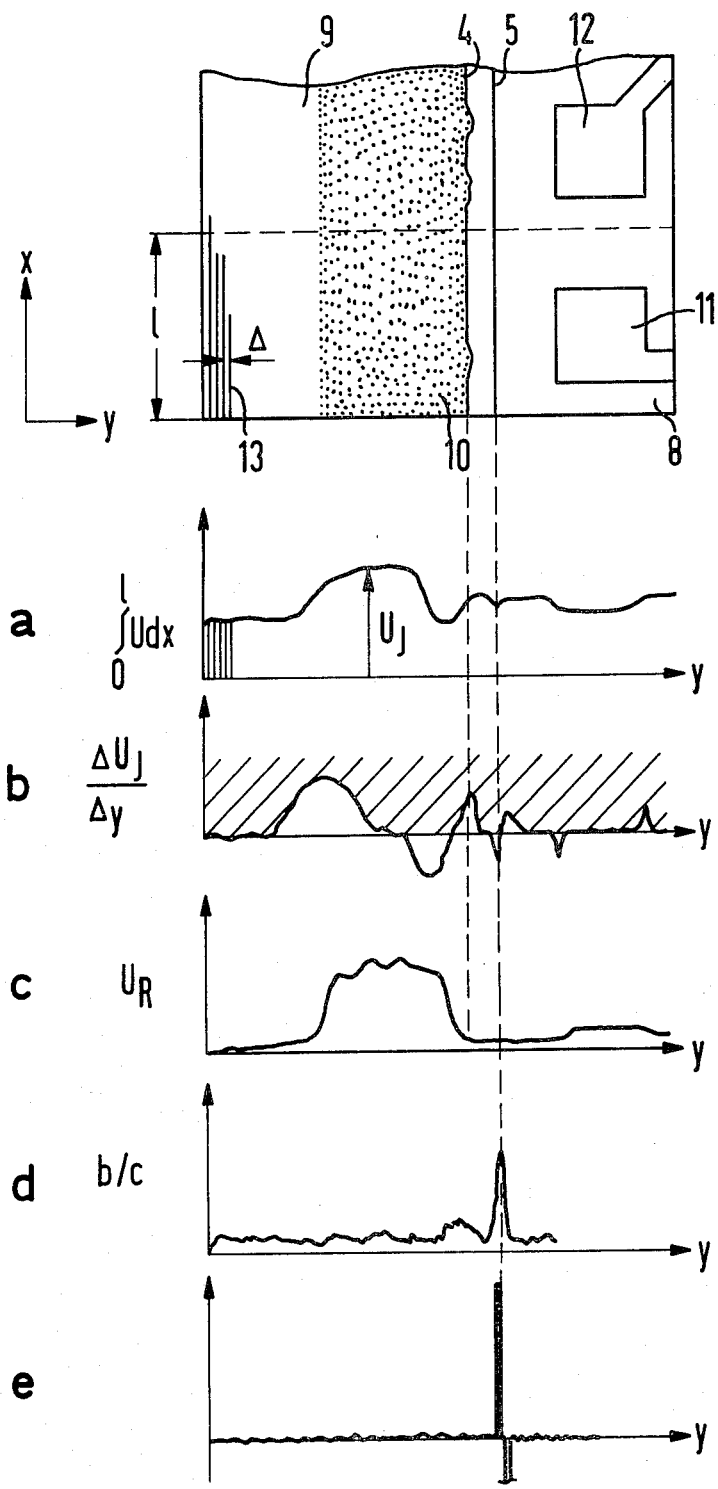

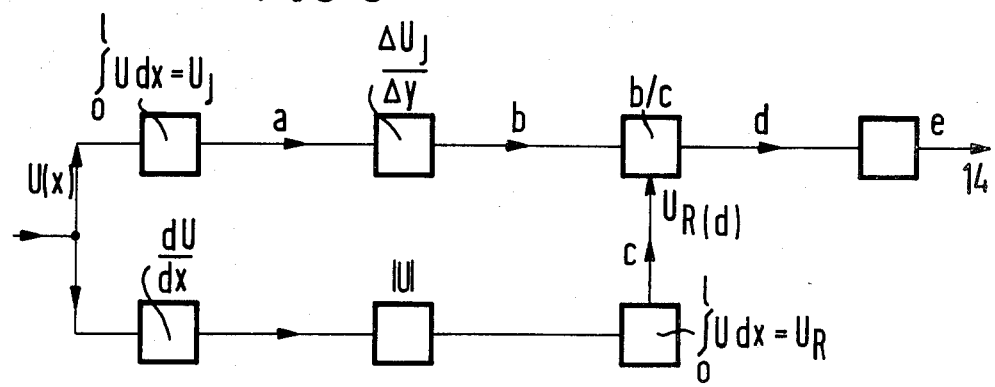
FIG 5
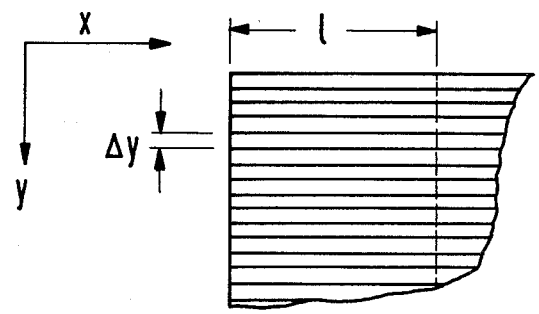
FIG 5A
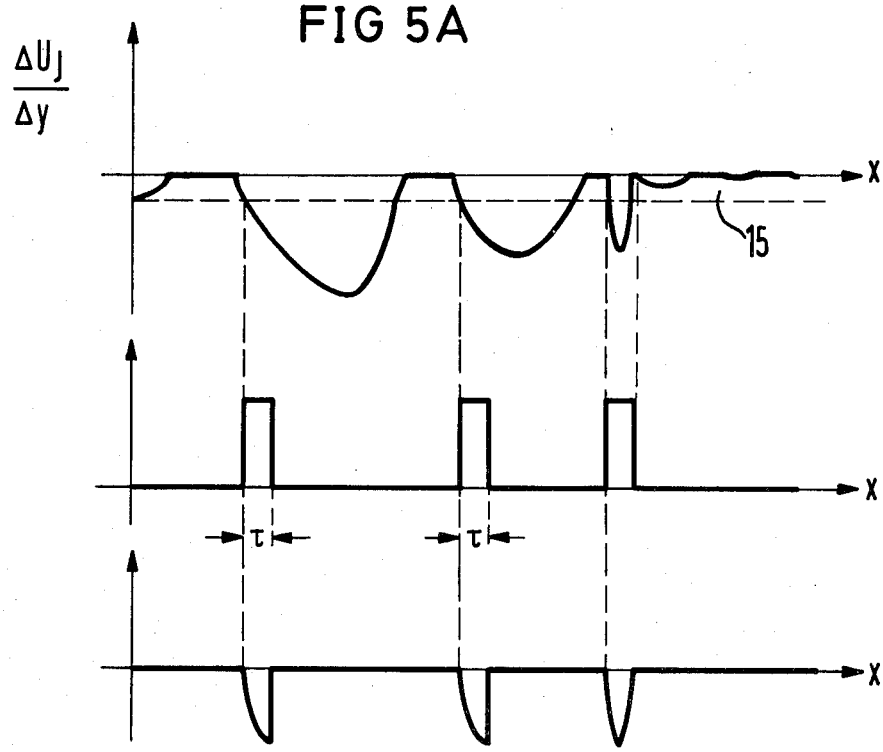

PROCESS AND AN APPARATUS FOR AUTOMATICALLY RECOGNIZING THE POSITION OF SEMICONDUCTOR ELEMENTS

BACKGROUND OF THE INVENTION

1. Field of the Invention

The present invention relates to an opto-electronic, non-contact apparatus and process for automatically recognizing the position of semiconductor elements, preferably integrated circuits, in a manner which is largely independent of pattern and surface properties, in particular for adjustment purposes in automatic wire assembly equipment and for the transfer of the semiconductor elements to automatic alloy/adhesive equipment in which the semiconductor element is transferred from the wafer to the system carrier.

2. Description of the Prior Art

Precise opto-electronic detection of dimensions, shape and position is frequently impeded by the following circumstances:

(1) Insufficient contrast between the object and its environment;

(2) Considerable fluctuations in contrast both in respect of time and location; and (3) Considerable local differences in brightness in the surroundings of the objects being investigated.

The German published application No. 2,404,183 describes and represents a device for the recognition of the position of a pattern. This known device has the disadvantage that the pattern recognition is type-specific, i.e. it must be re-equipped for each new pattern or type. Moreover, these patterns which fundamentally lie in the aluminum structure, change the reflective properties due to technological fluctuations and, consequently, impede a reliable recognition. Furthermore, this method of pattern recognition is expensive.

SUMMARY OF THE INVENTION

The object of the present invention is to provide a process, and an apparatus for carrying out the process, of the type generally set forth above, which is independent of type, is largely independent of surface, and can be implemented at a comparatively low expense.

Another object of the invention is to largely avoid the impeding circumstances referred to above.

The above objects are achieved, according to the present invention, in that the position of the semiconductor element, hereinafter simply chip, is determined by way of the cut edge and system edge (and not via the structure or pattern inside the chips) by means of a row-by-row scanning which leads from the surroundings of the chip and moves across the chip, where the rows run parallel, or virtually parallel, to the direction of the investigated rectilinear edge and the instantaneous intensities of the brightness values are integrated row-wise, or row-section-wise, the resultant values are stored, and the difference in the results of consecutive rows is formed. Then, only the polarity which corresponds to the investigated edge (e.g. system edge bright/dark) is used for further analysis. This result is also compared with a factor which corresponds to the roughness of the relevant position in the image, the differences in a rough zone are distinctly weakened and differences in a smooth zone are distinctly emphasized, and an additional electronic width analysis is used to emphasize sharp-edged lines (system edge, cut edge) from wide junctions, and as a result, by means of a row counting process, a signal for the correction of a position of the chip is formed and emitted. The cut edge is the chip boundary formed by the scratching or sawing process of the wafer. The system edge is the outermost regular structure of the chip, which generally encloses the entire active surface of the chip in the form of a quadrilateral structure and is generally formed as a result of a junction from silicon to silicon oxide.

The present invention enables a position recognition process, which is largely independent of pattern and thus of type, and which is not influenced by reflection properties of the surface, to be carried out with a high accuracy and speed.

In accordance with a further development of the invention, the section-by-section analysis of the image contents is carried out in one or more than one column(s) which are arranged beside one another or interlock with one another and extend at right angles to the scanning direction. The results of this column-by-column and row-by-row image processing which has been explained above are stored, in respect of their position in the row direction (row number), in a calculating unit, preferably a microprocessor, and in this manner, by means of a corresponding logic observation transverse to the columns, faulty results are distinguishes from those results which have been correctly assigned to the investigated edge. In this manner it is also possible to recognize the position of chips which differ from their ideal form due to locally limited damage (e.g. shell fracture) or as a result of disturbing particles. Moreover, this realization results in an increased reliability of recognition. The disturbances which are thus eliminated consist, in particular, of optical disturbances resulting from the chip environment.

In accordance with a further development of the invention for determining the angle and the two position coordinates of the chip, the process is carried out in several, preferably three, field of vision with identical or different, preferably orthogonal or scanning directions. This realization serves to determine the translatory and slighty rotary position deviation.

In accordance with a further development of the invention, in order to determine the cut edge, a clearly defined optical image is produced by exploiting the height dimension of the chip. This is carried out, for example, in that a parallel illumination is used at a direction which is inclined by a few degrees to the perpendicular and extends in the projection to the chip surface approximately parallel to the diagonal, and the observation is carried out at the reflection angle. The advantage of this process is that along the cut edge it produces a narrow shadow seam which appears absolutely dark and thus facilitates the recognition of the cut edge in the described process.

In accordance with a further development of the invention, preferably a parallel direct illumination is used to detect the system edge so that, as a result of its inclination, the system edge reflects the light in such a manner that it returns to the optical system in an only very slightly weakened form and thus appears as a narrow, dark line. This illumination also permits the system edge to be rendered sufficiently clearly visible for an analysis purposes.

For the implementation of a process carried out in accordance with the present invention, an optic is provided which preferably portrays a sufficiently large portion of the corner of a chip onto two image converters whose row-by-row scanning directions are orthogonal to one another. This ensures that the edges always extend parallel, or approximately parallel, to the scanning direction of the corresponding image converter. A third field of vision which serves for the detection of the angle of rotation is produced by methods of the second field of vision. As a result of this arrangement, it is possible to use commercially available television cameras for the row-by-row scanning. However, it is also possible to use semiconductor image converters (e.g. charge-coupled devices).

In accordance with a further development of the invention, only one image converter can be provided and the second image edge can be detected by optical image rotation. This embodiment of the invention has the advantage of economy and increased operating reliability.

However, it is also possible to provide only one image converter, the scanning directions of which are not predetermined. This obviates the need for optical image rotation and a second image converter. For example, image dissector tubes or random access semiconductor image converters are suitable for this purpose.

Another object of the invention is to provide an increased recognition reliability and a wider range of the detectable formation of system edges. This purpose is served by a more effective electronic detection of the roughness, as well as a logic monitoring of the results on the basis of an orthogonality criterion as well as a form (or shape) examination of the progression of the difference of the line-by-line integrals in the region of the cut edge and the system edge. Moreover, in the position determination for individual semiconductors and small integrated circuits, the method is to be carried out in one television image through utilization of two fields of vision arranged orthogonally on top of one another by means of optical methods, such that the recognition time is substantially shortened.

The above object is achieved in a particularly simple fashion by virtue of the fact that, for the electronic detection of a rough region, electronic signals, correspondingly allocated for each line, are generated due to the fact that, preferably, a differentiation in the line-direction and a following amount (or sum) formation as well as a line-integration, or line-section-integration, respectively, takes place, and that these results of the line-by-line allocated voltage values are brought into different phase positions relative to one another, and that the latter are preferably integrated by a sum formation. Through this expansion, rough regions which manifest singular smooth locations, are better integrated into a closed surface.

According to a further development of the invention, the system edge is effected by means of a form (or shape) recognition of the line-by-line integrals, or their differences, respectively, in the region of the cut edge and system edge. This form recognition is most easily triggered via a cut edge recognition. In order to determine the cut edge, parallel or a different incident (vertical) illumination is employed which supplies sufficient contours, in the case of the cut edge as well as in the case of the system edge, due to the slopes or the reflection differences, respectively, and the video signal from a line-by-line scanning, which runs approximately parallel to the subject edges, is integrated in a line-by-line fashion. In addition, the difference of successive line-by-line integrals is formed and, subsequently, this result is weighted with a signal which is proportional to the roughness, and the signal resulting therefrom activates a maximum value detector (or minimum value detector, respectively) by way of a comparator for determining the cut edge on the basis of the line-by-line difference of the integrals, and, by way of the result message, the cut edge is determined and, triggered thereby, a minimal value detector (or maximum value detector, respectively) determines the position of the system edge, likewise on the basis of the progression of the difference of the line-by-line integrals. It is thereby possible to discover system edges with greater certainty and simultaneously with a less pronounced contour. In addition, the system edge is permitted to manifest a universal character, such as, for example, bright/dark/bright transition or dark/bright or bright/dark transitions, respectively.

According to a further embodiment of the invention, in the case of a method having three fields of vision, of which two of such fields of vision are arranged, for example, on the longitudinal side and one on the transverse side, in order to avoid false recognitions in each of the three fields of vision, on the basis of two columns, respectively, one angle per field of vision is calculated, and the results of the field of vision are compared with one another. In addition, an angle can likewise be determined from the two fields of vision at a longitudinal edge, and the latter angle can be compared with the calculated angle from the transverse edge. Since the system edge, and the cut edge of an integrated circuit, respectively, extend orthogonally to one another, in a correct recognition these angles must be equal. The primary requirement for an automatic position recognition system, in addition to the recognition precision, is as low as possible a rate of erroneously recognized systems which can lead to a shut down of the machine. In order to avoid false recognitions, angle considerations are utilized which have as a basis the orthogonal progression of the cut edge, or the system edge, respectively.

In accordance with a further development of the invention, in a method for position determination, preferably, in the case of individual semiconductors and small integrated circuits with two orthogonally arranged fields of vision, the method can be designed such that, through corresponding optical image formation, blanking out, image rotation, or displacement, respectively, these fields of vision are mutually arranged on a single television camera, so that both coordinates can be simultaneously determined in one television image. In this manner, the object is achieved, through the simultaneous evaluation (or analysis) in one television image, that the analysis time is markedly abbreviated without necessitating an increase in the electronic expense (only one television camera, one analysis electronic system). In addition, the reliability of the system is increased with a simultaneous decrease in the manufacturing costs.

BRIEF DESCRIPTION OF THE DRAWINGS

Other objects, features and advantages of the invention, its organizations, constructions and modes of operation, will be best understood from the following detailed description, taken in conjunction with the accompanying drawings, on which:

FIG. 4 is a combination planar view of a semiconductor element and a plurality of analysis diagrams in accordance with the present invention;

FIG. 5 is a schematic circuit diagram which illustrates the principle of image analysis for recognizing the position of chips;

FIG. 5a is a graphic illustration of the analysis of the difference signal by exploitation of the small width of the system edge and cut edge;

DESCRIPTION OF THE PREFERRED EMBODIMENTS

Figure 1:
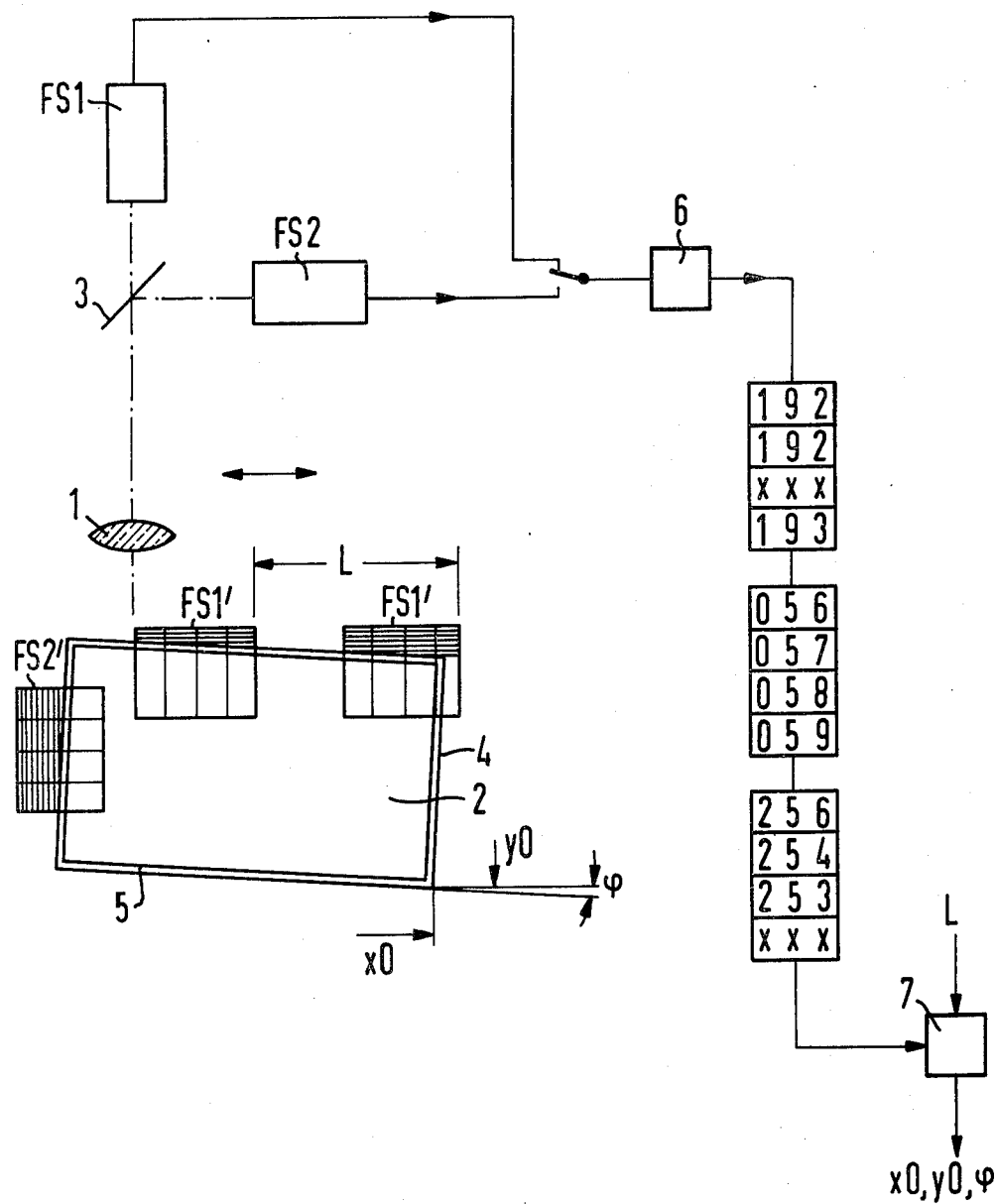
FIG. 1 is a schematic representation of an arrangement for automatic position recognition of the coordinates x, y and the angle of rotation.

FIG. 1 illustrates two image converters FS1 and FS2, the scanning directions of which are orthogonal to one another, and optic 1 and a chip 2 with three fields of vision and, for example, in each case four scanning columns. The cut edge is referenced 4 and the system edge is referenced 5. The signals of the image converters are fed to a corresponding analysis electronics unit 6 which, column-by-column detects the position of the edges in the form of row numbers and feeds these to a microprocessor 7 for processing at right angles to the column direction and for the determination of x0, y0 coordinates and the angle $\phi$. An exemplary embodiment of the analog analysis electronics unit 6 will be explained with reference to FIG. 5. The microprocessor can take the form of a SMP 8080 device as specified in the Siemens-Datenbuch 76/77 microprocessor Bausteine System SAB 8080. The cut edge and the system edge 5 extend parallel, or virtually parallel to the relevant row direction and at right angles, or approximately at right angles, to the column directions. The fields of vision FS1' and FS2' are assigned to the image converters FS1 and FS2, respectively.

According to the present invention, a row-by-row scanning of the image is carried out, the rows extending parallel, or approximately parallel to the direction of the investigated edge. Over one row or row section, the intensity is integrated and the integral voltage values of consecutive rows are subtracted. The difference voltages $\Delta u$ are formed only by those image components which possess an intensity gradient at right angles to the row direction and substantially retain this gradient value in the row direction over a specific path. By means of a further difference formation or an additional electronic width analysis, sharp-edged lines (system edge—cut edge) are emphasized in comparison to wide junctions.

The position of the edge is determined by means of a row counter with a comparator. As a result of integration in the row direction, the analysis is largely independent of disturbances in the path of the edge. It is also thereby possible to recognize edges whose contrast range is clearly below the noise amplitude of the video signal. The accuracy of the position recognition can also be promoted by forming the mean value of a plurality of results produced by parallel scanning and analysis in various zones of the image.

When carrying out the wire assembly of integrated circuits, it is necessary to detect the position of the chip on the system carrier in the x and y directions and the angle $\phi$. If a sufficiently low position tolerance exists between the cut edge and the system edge, it is possible to use the proposed process for recognizing the position of the cut edge. However, under certain conditions it is also possible to directly detect the position of the system edge. For this purpose, the chip is portrayed onto two image converters (e.g. television cameras FS1 and FS2 as illustrated in FIG. 1). The scanning directions of which are at right angles to one another thus facilitating the parallel scanning of orthogonal edges.

The angle of rotation $\phi$ is detected by way of a third field of vision which can be produced by displacing the first field of vision FS1' by an amount L. The amount of displacement FL is adjustable and will depend upon the particular size of the chip. The displacement is advantageously carried out by means of a rotatable reflector (not shown) in the beam path of the optic.

Figure 2:
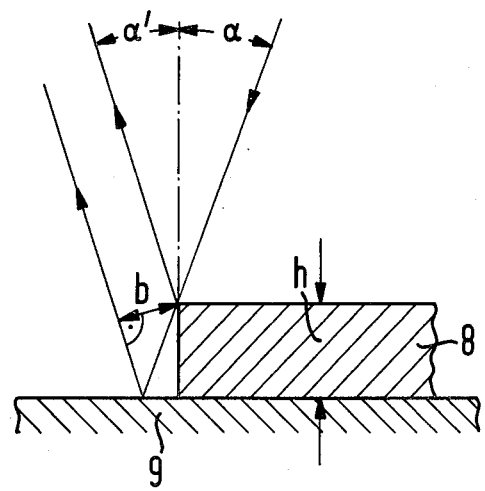
FIG. 2 is a schematic representation which illustrates the illumination arrangement for the exploitation of the height dimension of a chip.

As the chip surroundings can differ considerably in respect of the brightness distribution due to various adhesive and alloying processes, a shadow casting process (FIG. 2) is carried out in order to increase the recognition reliability. Here the chip 8 which has a height h and which is alloyed or secured by adhesive to the system carrier 9, is illuminated with parallel light. The illumination direction $\alpha$ is inclined by a few degrees to the perpendicular. In the direction of observation $\alpha'$, a shadow seam 10 having a width b then appears on the chip edge. The angles of observation and illumination are generally equal. The width of the shadow seam b is governed by the function $$b = 2h \sin \alpha.$$

Figure 3:
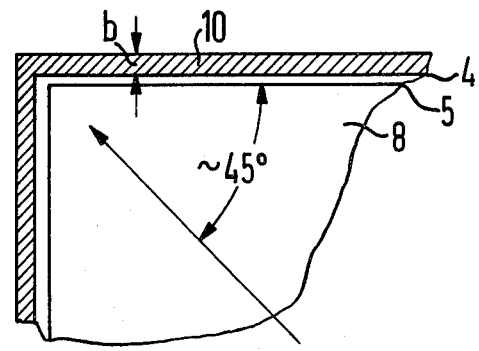
FIG. 3 illustrates a portion of a semiconductor element having a shadow seam.
Figure 3A:
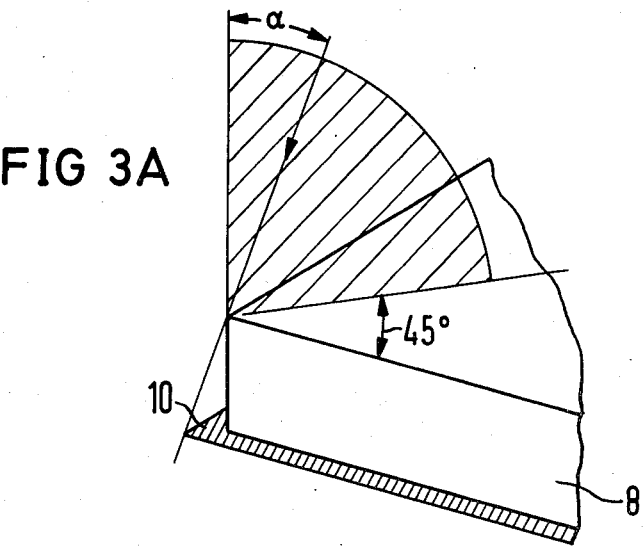
FIG. 3a is a perspective view of the illumination arrangement.

In order to produce the requisite shadow seam on both sides of the chip edge, the direction of observation and illumination relative to the chip plane runs at approximately 45° to the chip edge as can be seen from FIG. 3. By way of further explanation, FIG. 3A illustrates the illumination direction, the chip 8 and the produced shadow seam 10 in a perspective view.

In addition to the interrogation and difference formation, an electronic analysis of the roughness off the surface is also carried out and advantageously consists of differentiation in the row direction followed by amount formation and row-wise or row-section-wise integration. The system edge always lies in a zone which appears to be optically "smooth" and is characterized by a light/dark transition. Disturbing light/dark transitions resulting from the signal of the first difference, which are not to be assigned to the system edge, are caused by the relatively rough system carrier and by rough adhesive edges. By weighting the first difference with a roughness signal of the type described above which is obtained row-wise (e.g. by division) it is possible to carry out a reliable, electronic recognition of the system edge.

The upper section of FIG. 4 illustrates a portion of a type of chip 8 with its edge surroundings, generally formed by a system carrier 9 and an irregularly-shaped adhesive and alloying compound 10. Also illustrated are the cut edge 4 and the system edge 5 at the rear, and the contacting areas 11 and 12. The position of the rows 13 and the zone "1" of the integration are clearly illustrated in FIG. 4.

The curve in the diagram a of FIG. 4 illustrates the result of the row-by-row integration in the upper section of the image over the integration length "1".

In the next step, as illustrated in the diagram b of FIG. 4, the difference is formed between the integrated voltage values which are assigned to adjacent rows. As a result of the operation illustrated in the diagram a and b, rectilinear edges which extend approximately parallel to the scanning direction are emphasized in relation to the other image elements such as, for example, irregularly-shaped contours.

As a result of its characteristics ("inclination") the system edge can always be recognized as a light-dark transition if the direction of scanning leads from the chip surroundings. Under identical scanning conditions, the cut edge always appears as a dark/light transition due to the shadow-forming illumination. Depending upon the nature of the edge which is to be determined, the polarity of the signal in the diagram b can be clipped. In the illustrated example, the system edge is being investigated. Its light/dark transition should be assigned to the negative zone in the diagram b. Consequently, the positive zone need not be considered for the further image processing.

Due to very extensive disturbances in the environment, the image contents which have been processed in this manner can still contain signals, the level of which clearly exceeds the difference signal at the point of the investigated system edge. In order to suppress these disturbances, the smoothness of the surface in which the system edge is arranged, in contrast to the rough and irregularly shaped image elements of the environment (system carrier, adhesive), is used by way of further criterion. For this purpose, the signal emanating from the image converter is differentiated, rectified and again integrated row-by-row in the region of the integration length "1". The curve $U_R$ of the diagram c of FIG. 4 is a gauge of the roughness of the surface. The signal b is now weighted with the curve of the roughness signal c, so that the signal b is weakened in rough zones and intensified in smooth zones. This can be carried out by dividing the signal b by the signal c. The result of this weighting is shown in the signal curve of the diagram d. The further difference formation of voltages which are to be assigned to adjacent rows in the signal d results in a further intensification of sharp-edged transitions as represented by the system edge.

The final result of this row-by-row image processing which, for reasons of time and expense, is preferably carried out in analog form, is illustrated in the diagram e. A comparison with the general view at the top of FIG. 4 will illustrate how the entire image contents has been compressed to a narrow, extremely prominent line, which locally coincides with the system edge, and the position of which can now be further processed by way of a row number (FIG. 1).

FIG. 5 schematically illustrates the fundamental process. The incoming video signal U(x) of a row-by-row image converter is split into two channels. The upper channel serves to emphasize the rectilinear curves from irregularly shaped contours in accordance with FIG. 4, the signal curve a and b.

The lower channel serves for the electronic detection of the differing degrees of roughness. For this purpose, following differentiation of the video signal U(x), the result is rectified (U) and then subjected to row-by-row integration. A logical linkage of the two channels by division to obtain the values b/c, followed by a repeated row-by-row difference formation in the region of the investigated system edge or cut edge, supplies a narrow line which is extremely intensive in comparison to the preceding image contents. This difference formation corresponds to the difference formation in the upper channel following integration. The curve e in FIG. 4 represents the results. The local position must be related to the investigated cut edge or system edge via a row counter 14.

In addition, it can be advantageous, in the upper channel, following the difference formation of the row-wise integrals, to introduce a criterion which employs the small width of the difference signal in the region of the system edge or cut edge and thus suppresses wide zones of the image contents, in particular of the environment. This is preferably carried out in that the signal b is fed to a comparator in accordance with FIG. 5. If the signal exceeds a voltage threshold 15, a gate, consisting of an analog switch, is opened and closed again after a given time $\tau$. The time $\tau$ corresponds to the maximum duration of the difference signal in the region of the investigated system edge. The difference signal now passes through the analog switch in accordance with these times. As a result, the difference signal is fully retained in the region of the investigated system edge. In the remaining area it is substantially clipped. In this manner, only a few image portions are formed which are wide in accordance with the time $\tau$. A further electronic unit can be used to distinguish which image portions have been formed in accordance with the time $\tau$ by clipping a wider signal and which contain difference signals whose width corresponds to that of the system edge.

The electronic formation of the integral voltage values as shown in FIG. 5 can be carried out, for example, using an approximately connected operational amplifier of the type AM 450-2 produced by Datel, in combination with an analog switch AH 0015 CD produced by the National Semiconductor Company.

The difference formation of the row-wise integrals as illustrated in FIG. 4, signal curves b and e, can be carried out, for example, using two sample and hold modules SHM-Ic-1 produced by the Datel company. The differentiation and rectification in the lower channel can also be carried out using the aforementioned operational amplifiers and corresponding connections.

The further image analysis is carried out in digital form in a microprocessor. For each column, the microprocessor is informed of the row numbers of the locations which have been evaluated as a system edge as a result of the analog analysis. Parallel comparisons of the row contents serve to single out incorrectly evaluated locations. The probability that incorrectly evaluated locations will occur beside one another in two adjacent columns is low, as can be seen from FIG. 6. The determination of the deviations x, y and the angle of rotation $\phi$ of the integrated circuit is carried out by analyzing the results of the three individual fields of vision, the arrangement of which can be seen in FIG. 7.

Figure 6:
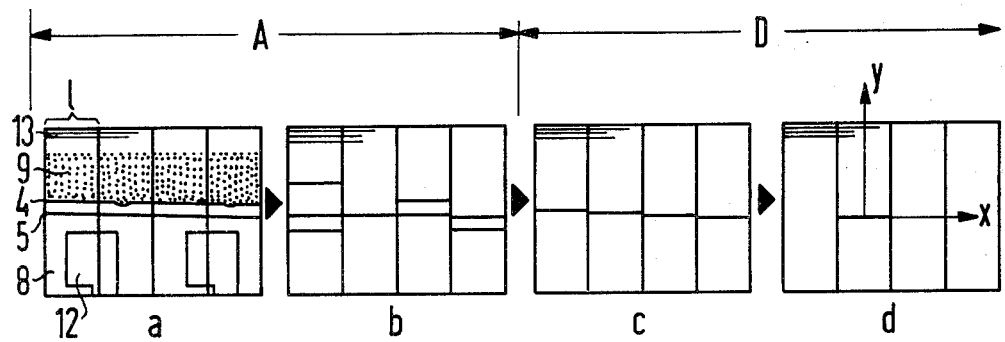
FIG. 6 illustrates the system analysis by analog and digital image processing.
Figure 7:
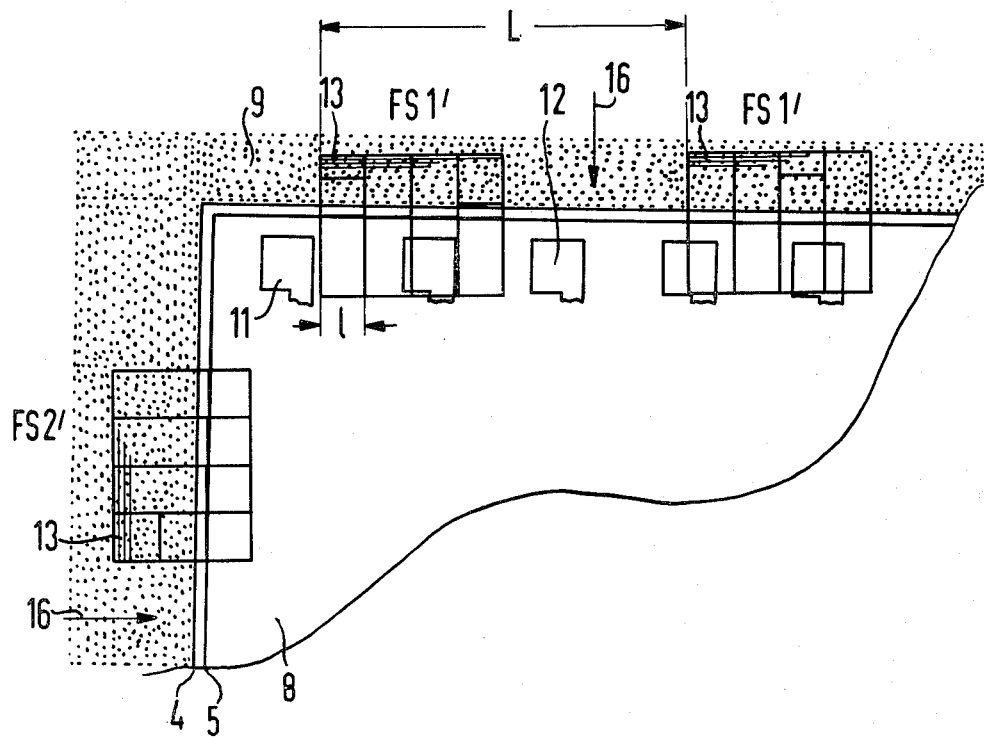
FIG. 7 illustrates the position recognition of integrated circuits.

In the left-hand half A, FIG. 6 is linked to FIGS. 4 and 5, preferably with analog image processing, and illustrates the further information processing which is carried out, in particular, in digital fashion in a microprocessor in terms of software.

The section a in FIG. 6 again illustrates a field of vision, e.g. FS1 of FIG. 1, with the row-by-row scanning 13, the columns at right angles thereto and the portion of the chip 8 with the system edge 5 and the cut edge 4. The section b demonstrates the resultant column-wise reduced image contents. In addition to the investigated system edge and cut edge, this image content can also contain lines which have been formed by the, preferably analog, image analysis and which are not to be assigned to the system edge. By comparing the position of the lines and the various columns to one another, those lines which are not arranged on a straight line, as represented by the system edge, are eliminated, as illustrated in the section c.

By way of the final stage (section d), one column is singled out and the row numbers of the determined edge at this point are used, together with the corresponding results from the other two fields (e.g. FS2', FS1' of FIG. 1), to finally determine x, y and $\phi$. The value of the displacement path L (FIG. 1) also participates in the calculation of x, y and $\phi$ from the result of the three individual fields (row number and column number).

By way of summary of the foregoing, FIG. 7 again illustrates the position of the three fields of vision, the scanning direction 16, the row direction 13 with the integration length "1", the column arrangement, for example the cut edge 4, and the displacement path L. The results of the, preferably analog, image processing in the example of the determination of the system edge have been entered in the individual columns.

Figure 8:
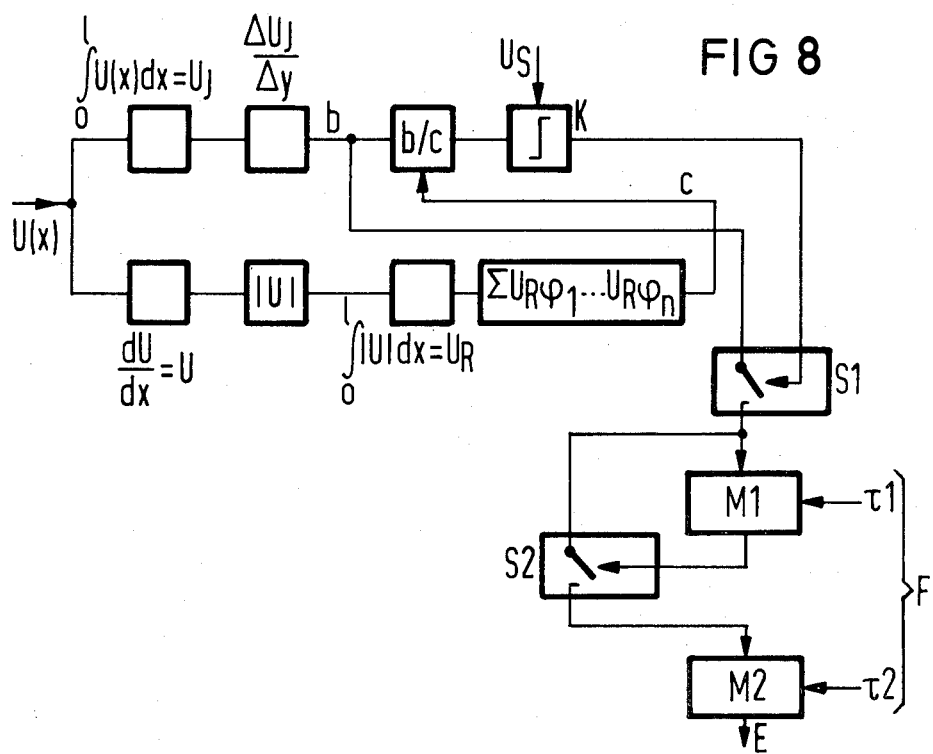
FIG. 8 illustrates an expanded circuit principle for the position recognition of the system edge by means of universal detection of the roughness and form (or shape) recognition in the area of the cut edge and the system edge.

FIG. 8 illustrates a schematic representation of the basic signal progression. The incoming video signal U(x) of an image converter, operating in a line-by-line fashion is divided into two channels. The upper channel serves for emphasizing the rectilinear edges from the irregularly formed (or shaped) contours.

Figure 10:
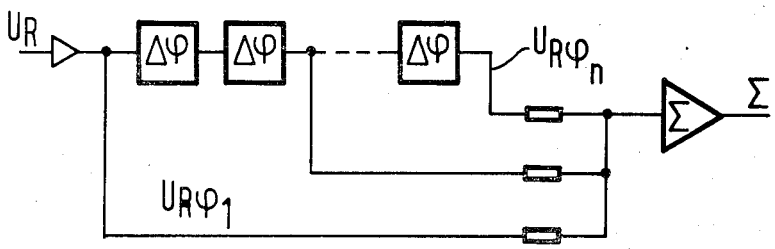
FIG. 10 illustrates a possible circuit arrangement for integrating (or combining) the roughness signals.

The lower channel serves the purpose of electronic detection of the varying roughness. To this end, following a differentiation of the video signal U(x), this result is rectified |U| and then integrated in line-by-line fashion, and then brought into different phase positions and subsequently integrated, in the easiest manner by means of a sum formation (FIG. 10). A linking of the two channels through division b/c emphasizes rectilinear edges in the smooth region and suppresses possible interferences in the rough region. With the signal of the line-by-line difference of the integrals, thus weighted, the beginning of the region of the cut edge/system edge is determined via a comparator K, and the original, unweighted line-by-line difference signal of the integrals is through-connected to a form recognition circuit by way of a switch S1 which is only symbolically illustrated.

The form recognition circuit F comprises an extreme value determination member, or members, for the line-by-line integrals, or their differences. The latter preferably consist of a maximum value detector M1 for the determination of the cut edge and a minimum value detector M2, activated via a switch S2 by this result, for the desired system edge. Depending upon the signal progression, instead of the maximum value detector M1, a minimum value detector M2 can take its place and vice-versa. As the result E, there is then present a line number for the position of the system edge.

Figure 9:
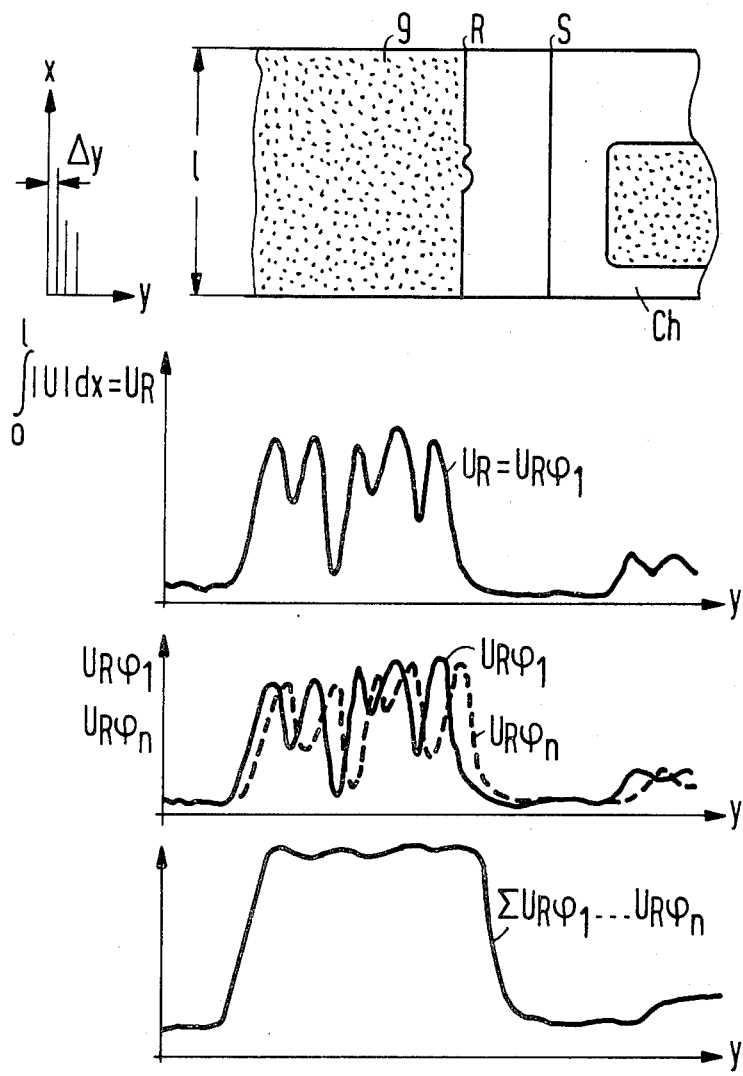
FIG. 9 illustrates roughness signals in a different phase position and their integration, for the purpose of producing a closed surface in the rough region (or area)

In the first diagram of FIG. 9, the progression of the roughness integral $U_R$ is represented perpendicularly to the integration direction, or the line direction, respectively. Breaks in a region which is rough per se can be clearly ascertained, which breaks, in the case of a weighting of the line-by-line difference of the integrals, would achieve an insufficient weakening of the signal.

Therebelow, the same signal is illustrated with different phase positions, of which only one is indicated in broken lines. Below this illustration, it is shown how, through integration ($\Sigma$) of the different phase positions, local breaks in the progression of the roughness integral $U_P$ are filled.

By way of the diagrams of FIG. 9, the section of a chip Ch with a cut edge R, a system edge S, an integration length "1", and its surroundings are plotted, which approximately corresponds to the signal progression in the diagrams.

FIG. 10 illustrates a possible circuit arrangement for integrating the different positions of the roughness signals. Advantageously, the phase positions $\Delta \phi$ are realized through delay by one television line, respectively, with sample and hold stages.

Figure 11:
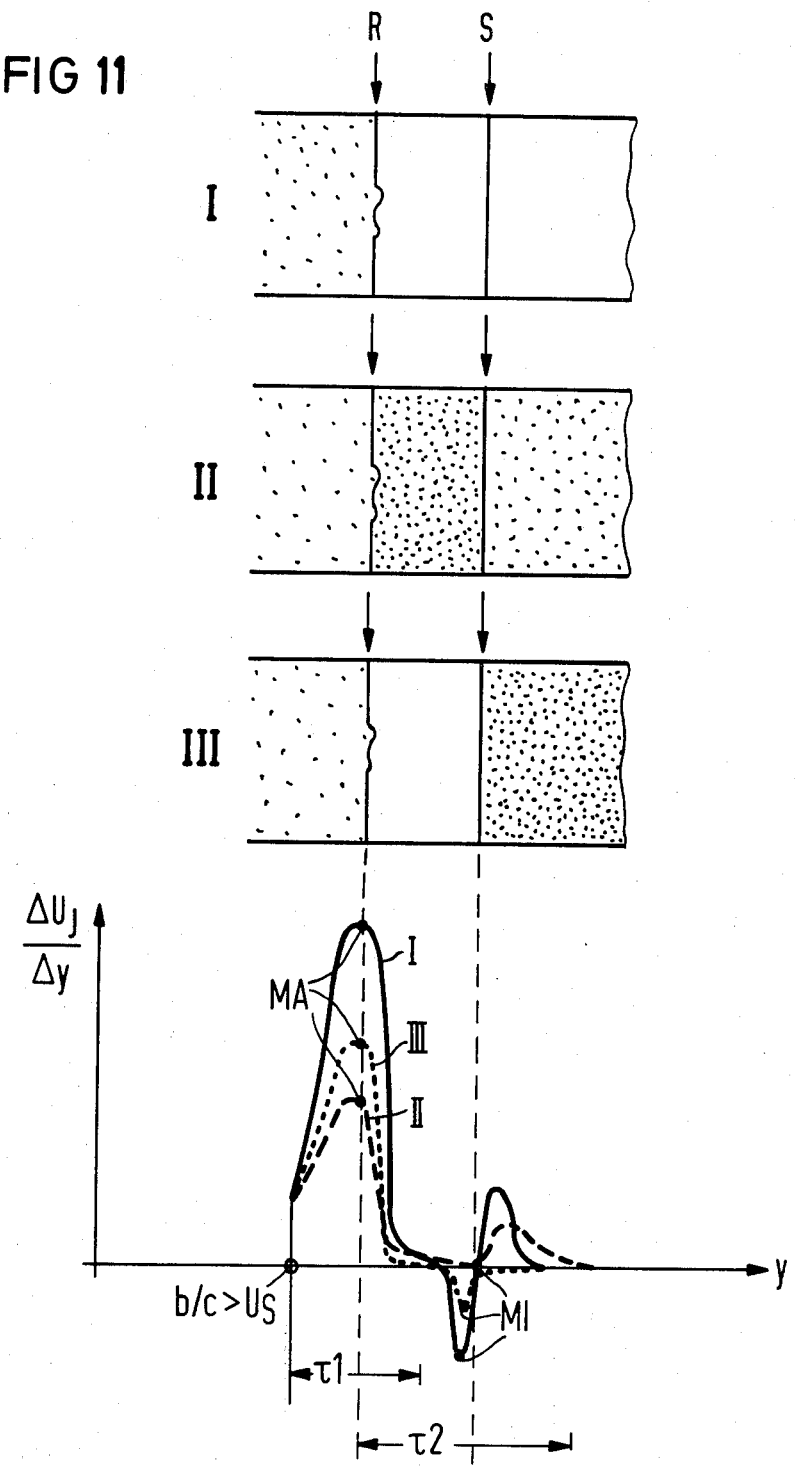
FIG. 11 illustrates the form (or shape) recognition in the region of the cut edge and the system edge, as well as permissible different embodiments of the system edge.

FIG. 11 illustrates three examples I–III for fundamentally possible designs of the chip and its surrounding in the region of the cut edge and the system edge. In addition, the progression of the difference of the line-by-line integrals in this region for the three examples is illustrated as locally allocated. The respective progression illustrates that, for all three examples I–III, the system edge can be clearly found by way of a maximum value determination MA, or a minimum value determination MI. Here, $\tau_1$ is the time range in which the maximum value detector, activated by the comparator K, is effective, while $\tau_2$ is the range in which the minimum value detector MI, activated by the result of the preceding maximum value detector MA, is effective.

Figure 12:
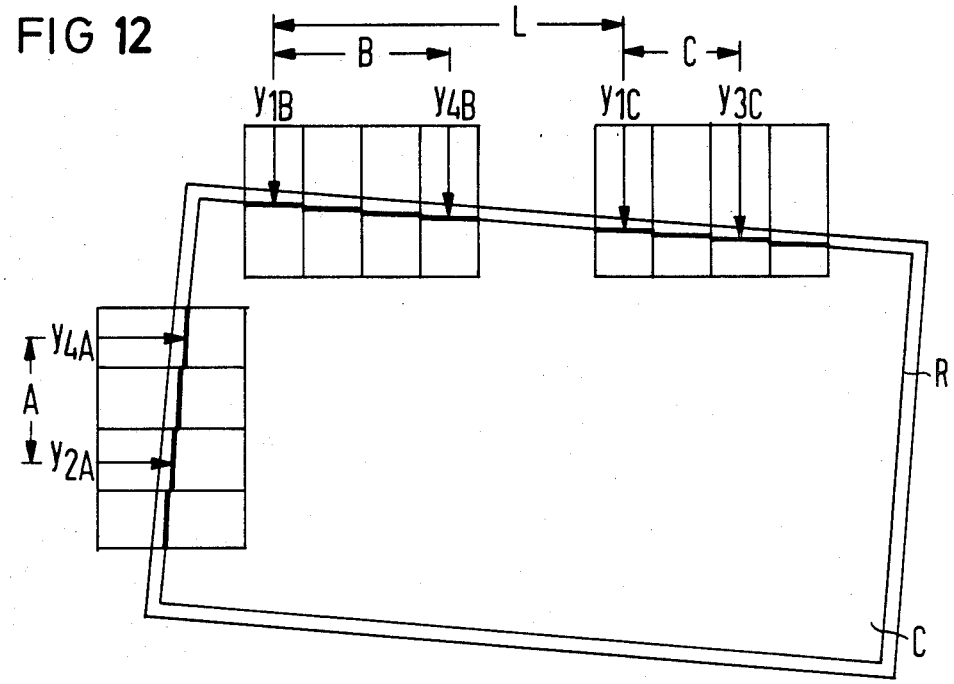
FIG. 12 illustrates a possible monitoring of the orthogonality criterion of the purpose of avoiding false recognitions.

FIG. 12 illustrates an integrated circuit Ch having the three fields of vision A, B, C and their column-wise subdivision, as well as the position of the system edge $y_{2A} \ldots y_{3C}$ in the individual columns. Checking the orthogonality criterion consists, for example, in that, within each field of vision, an angle is calculated in two columns from the position of the system edge, and that it is determined whether these three calculated angles mutually agree. The angle $\alpha_A$ is calculated, for example, according to $$\alpha_A = \text{arc tan } (y_{2A} - y_{4A})/A.$$

The calculation of the other angles proceeds correspondingly on the basis of $y_{1B}$, $y_{4B}$ for the field of vision B as well as $y_{1C}$, $y_{3C}$ for the field of vision C.

It is additionally determined whether the angle formed from a column in the field of vision B and a column in the field of vision C, agrees with the angle $\alpha_A$ from the field of vision A, for example according to the equation $$\phi = \arctan(y_{1B} - y_{1C})/L$$

where L corresponds to the length in FIG. 5.

Figure 13A:
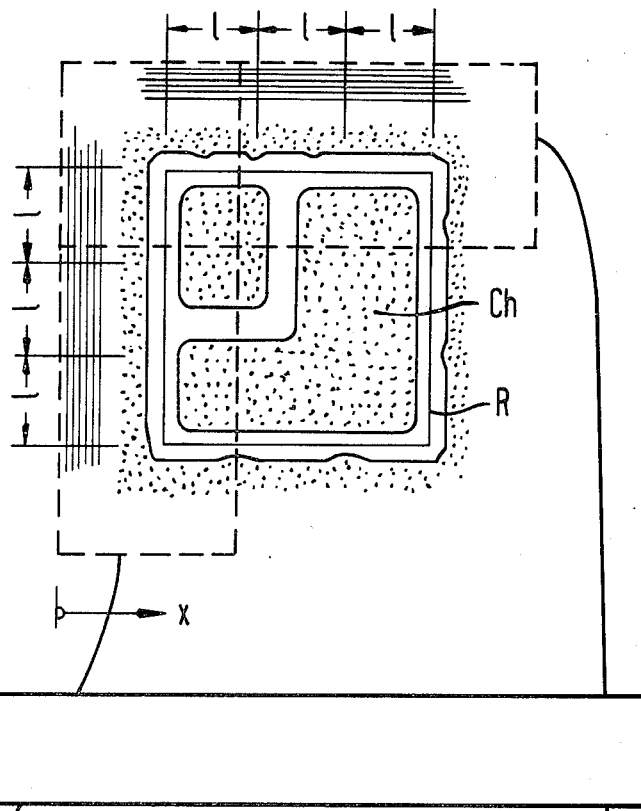
FIGS. 13a and 13b illustrate the position determination in x and y directions in a single field of vision by means of corresponding arrangement of the individual fields of vision.
Figure 13B:
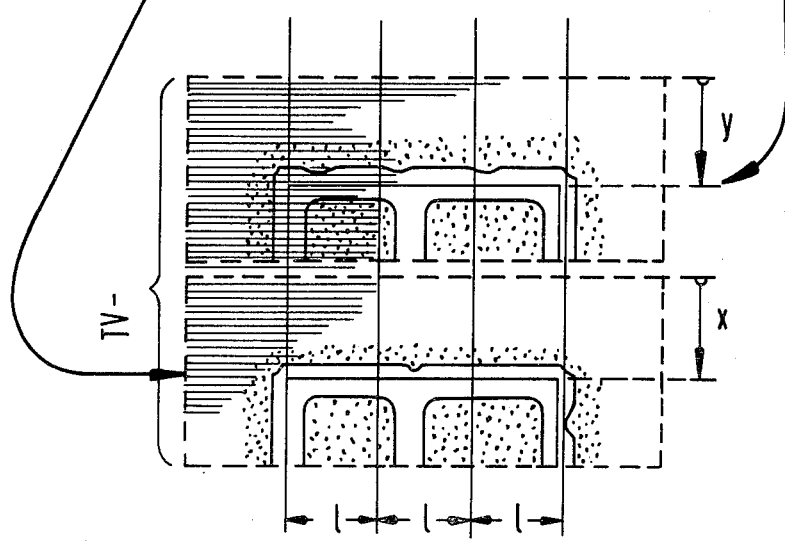

FIG. 13 illustrates an individual semiconductor and its surrounding with two fields of vision, arranged orthogonally one on top of the other, for the position determination in the x direction and the y direction, as well as a division of these two fields of vision by means of a corresponding optical image formation, image rotation, or displacement, respectively, into a common television image (6b), such that, within one television image, the position in the x direction as well as in the y direction can be determined. The advantage of this arrangement can be seen in that the recognition time is clearly shortened and the reliability of the system is improved through a reduction in the analysis electronic apparatus.

Although I have described my invention reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution of the art.

I claim:

1. A method for automatically recognizing the position of a semiconductor element by investigating the same with respect to at least one rectilinear edge of an element to obtain adjustment information, comprising the steps of: illuminating the semiconductor element;
   imaging and optically scanning across a semiconductor element image and its surroundings row-by-row in rows which are substantially parallel to the investigated edge and generating electrical signals representing the light intensity of the optically scanned rows;
   integrating the instantaneous values of the electrical signals of each row;
   storing the integrated values;
   comparing the integrated values of adjacent rows and producing bipolar difference values therefrom;
   weighting the difference values of one polarity with a predetermined factor which corresponds to the roughness of the particular position in the image decreasing the difference values in a rough zone and increasing the difference values in a smooth zone;
   forming further difference values from the weighted difference values to emphasize sharp-edge lines of the image; and
   providing, by row counting, a signal for correcting the position of the semiconductor element.

2. The method of claim 1, comprising the further steps of:
   storing the scanning results for columns which are orthogonal to the scanning direction by row number in which they occur indicating their positions in the column direction; and
   logically comparing the results transversely of the columns to distinguish faulty results from correct results of the investigated edge.

3. The method of claim 1, comprising, in order to determine the x and y coordinates and the angle of rotation ($\phi$), the steps of:
   performing the listed steps for a plurality of fields of vision of the semiconductor element.

4. The method of claim 2, further defined as:
   performing the listed steps for three fields of vision of the semiconductor element.

5. The method of claim 2, further defined as:
   performing the steps of scanning in the same direction for each field of vision.

6. The method of claim 2, further defined as:
   performing the steps of scanning in different directions for each field of vision.

7. The method of claim 2, further defined as:
   performing the steps of scanning in orthogonal directions for the fields of vision.

8. The method of claim 1, wherein the step of illuminating is further defined as:
   orienting the direction of illumination to exploit the thickness of the element and produce a well defined edge shadow representing a cut edge.

9. The method of claim 8, wherein the element also has an associated system edge, and in order to detect the system edge, the step of illuminating is further defined as:
   illuminating the semiconductor element with direct parallel illumination so that the inclination of the system edge reflects the light for imaging in a weakened form so as to appear as a narrow, dark line.

10. The method of claim 8, wherein:
    the step of illuminating is carried out at an angle inclined a few degrees to the perpendicular; and
    the step of imaging is carried out at the angle of reflection.

11. A method for automatically recognizing the position of a semiconductor element by investigating the same with respect to at least one rectilinear edge of the element to obtain adjustment information, comprising the steps of: illuminating the semiconductor element;
    imaging and optically scanning across the semiconductor element image and its surrounding line-by-line substantially parallel to the investigated edge and generating video signals representing the light intensity of the scanned lines;
    differentiating and rectifying the video signals;
    integrating the rectified signals on a line-by-line basis;
    phasing the integrated signals with respect to one another; and
    integrating the phased signals so that rough zones which manifest singular smooth locations are integrated into a closed surface to prevent errors.

12. The method of claim 11, wherein the edge is the cut edge of a semiconductor chip which also has an adjacent system edge, comprising the further step of:
    comparing the integrated signals in the region of the cut and system edges to identify the cut edge.

13. The method of claim 11, wherein the semiconductor element is a chip having a cut edge and a system edge, and the step of illuminating is further defined as:
    providing parallel incident illumination of the cut and system edges; and
    comprising the further step of:

weighting the line-by-line integrated values with a predetermined signal representing the roughness;

comparing the weighted and unweighted signals to determine, on the basis of line-by-line differences, minimum and maximum values which represent the cut and system edges.

14. The method of claim 11, wherein the semiconductor element is a chip having a cut edge and a system edge, wherein the step of imaging and scanning is further defined as:

imaging and scanning with three fields of vision located such that two fields of vision are spaced along one side of the chip and the third field of vision is along a side of the chip which is transverse to the one side; and, in order to prevent false recognitions in each of the three fields of vision, comprising the further steps of:

determining, from the information obtained in two columns transverse of the line scanning direction for at least two of the fields of vision, respective angles of rotation; and comparing the angles for equality.

15. The method of claim 11, wherein the step of imaging is further defined as:

imaging two orthogonally-arranged fields of vision at respective orthogonal edges of the semiconductor element;

superposing the resulting two images to produce a single image; and applying the single image to a single image converter.

16. A method for automatically recognizing the position of a semiconductor element by investigating the same with respect to an edge of the element to obtain adjustment information, comprising the steps of:

illuminating the element with light to produce a shadow which defines the edge by a dark/light transition;

imaging and scanning the element image line-by-line substantially parallel to the edge to produce a video signal;

integrating the video signal in a line-by-line fashion;

forming difference signals from successive ones of the line-by-line integrated signals;

weighting the difference signals with a predetermined value representing element roughness;

comparing the weighted and unweighted signals in order to obtain a comparison value; and sensing for the maximum comparison value, maximum value which represents the investigated edge.

17. The method of claim 16, wherein the edge is the cut edge of a semiconductor chip which also has a system edge, and further comprising the steps of:

sensing for the minimum comparison value, which minimum value represents the system edge.

18. A method for automatically recognizing the position of a semiconductor element by investigating the same with respect to an edge of the element to obtain adjustment information, comprising the steps of:

illuminating the element with light to produce a shadow which defines the edge by a dark/light transition;

imaging and scanning the element image line-by-line substantially parallel to the edge to produce a video signal;

integrating the video signal in a line-by-line fashion;

forming difference signals from successive ones of the line-by-line integrated signals;

weighting the difference signals with a predetermined value representing element roughness;

comparing the weighted and unweighted signals in order to obtain a comparison value; and sensing for the minimum comparison value, minimum value which represents the investigated edge.

19. The method of claim 18, wherein the edge is the cut edge of a semiconductor chip which also has a system edge, and further comprising the step of:

sensing for the maximum comparison value, which maximum value represents the system edge.

20. A method for automatically recognizing the position of a semiconductor element by investigating the same with respect to at least one rectilinear edge of the element to obtain adjustment information, comprising the steps of:

illuminating the semiconductor element;

imaging and optically scanning across the semiconductor element image and its surroundings line-by-line substantially parallel to the investigated edge and generating video signals representing the light intensity of the scanned lines;

differentiating and rectifying the video signals;

integrating the rectified signals on a line section-by-line section basis;

phasing the integrated line-section signals with respect to one another; and integrating and integrated and phased line section signals so that rough zones which manifest singular smooth locations are integrated into a closed surface to prevent errors.

21. Apparatus for automatically recognizing the position of a semiconductor element by investigating the same with respect to at least one rectilinear edge of the element to obtain adjustment information, comprising:

means for illuminating the semiconductor element;

means for imaging and optically scanning across the semiconductor element image and its surroundings line-by-line substantially parallel to the investigated edge, including means for generating video signals representing the light intensity of the scanned lines;

means for differentiating and rectifying the video signals;

means for integrating the rectified signals on a line-by-line basis;

means for phasing the integrated signals with respect to one another; and means for integrating the phased signals so that rough zones which manifest singular smooth locations are integrated into a closed surface to prevent errors.

22. The apparatus of claim 21, wherein the edge is the cut edge of a semiconductor chip which also has an adjacent system edge, comprising:

means for comparing the integrated signals in the region of the cut and system edges to identify the cut edge.

23. Apparatus for automatically recognizing the position of a semiconductor element by investigating the same with respect to at least one rectilinear edge of the element to obtain adjustment information, comprising:

a light source for illuminating the semiconductor element;

an optic for imaging and an image converter optically linked thereto for optically scanning across, the semiconductor element image and its surroundings line-by-line substantially parallel to the investigated edge and generating video signals representing the light intensity of the scanned lines;

differentiating means connected to said converter and rectifier means connected to said differentiating means for differentiating and rectifying the video signals;

first integrating means connected to said rectifier means for integrating the rectified signals on a line section-by-line section basis;

phasing means connected to said first integrating means for phasing the integrated signals with respect to one another; and second integrating means connected to said phasing means for integrating the phased signals to that rough zones which manifest singular smooth locations are integrated into a closed surface to prevent errors.

24. The apparatus of claim 23, wherein the edge is the cut edge of a semiconductor chip which also has an adjacent system, comprising:

means for comparing the integrated signals in the region of the cut and system edges to identify the cut edges.

25. Apparatus for automatically recognizing the position of a semiconductor element by investigating the same with respect to an edge of the element to obtain adjustment information, comprising:

means for illuminating the element with light to produce a shadow which defines the edge by a dark/light transition;

means for imaging and scanning the element image line-by-line substantially parallel to the edge to produce a video signal;

means for integrating the video signals in a line-by-line fashion;

means for forming difference signals from successive ones of the line-by-line integrated signals;

means for weighting the difference signals with a predetermined value representing element roughness;

means for comparing the weighted and unweighted signals in order to obtain a comparison value; and means for sensing the maximum comparison value, which maximum value represents the investigated edge.

26. The apparatus of claim 25, wherein the edge is the cut edge of a semiconductor chip which also has a system edge, and further comprising:

means for sensing for the minimum comparison value, which minimum value represents the system edge.

27. Apparatus for automatically recognizing the position of a semiconductor element by investigating the same with respect to an edge of the element to obtain adjustment information, comprising:

means for illuminating the element with light to produce a shadow which defines the edge by a dark/light transition;

means for imaging and scanning the element image line-by-line substantially parallel to the edge to produce a video signal;

means for integrating the video signal in a line-by-line fashion;

means forming difference signals from successive ones of the line-by-line integrated signals;

means for weighting the difference signals with a predetermined value representing element roughness;

means for comparing the weighted and unweighted signals in order to obtain a comparison value; and means for sensing for the minimum comparison value, minimum value which represents the investigated edge.

28. The apparatus of claim 27, wherein the edge is the cut edge of a semiconductor chip which also has a system edge, and further comprising:

means for sensing for the maximum comparison value, which maximum value represents the system edge.

29. Apparatus for automatically recognizing the position of a semiconductor element by investigating the same with respect to at least one rectilinear edge of an element to obtain adjustment information, comprising:

illuminating means for illuminating the semiconductor element;

means for imaging and optically scanning across a semiconductor element and its surroundings row-by-row in rows which are substantially parallel to the investigated edge, including means for generating electrical signals representing the light intensity of the optically scanned rows;

integrating means for integrating the instantaneous values of the electrical signals of each row;

storage means storing the integrated values;

signal comparison means for comparing the integrated values of adjacent rows and producing bipolar difference values therefrom;

weighting means for weighting the difference values of one polarity with a predetermined factor which corresponds to the roughness of the particular position in the image decreasing the difference values in a rough zone and increasing the difference values in a smooth zone;

means for forming further difference values from the weighted difference values to emphasize sharp-edge lines of the image; and output means, including a row counter, for providing, by row counting, a signal for correcting the position of the semiconductor element.

30. The apparatus of claim 29, comprising:

means for storing the scanning results for columns which are orthogonal to the scanning direction by row number in which they occur indicating their positions in the column direction; and logic means for logically comparing the results transversely of the columns to distinguish faulty results from correct results of the investigated edge.

31. The apparatus of claim 29, wherein the semiconductor element is a semiconductor chip having cut and system edges and at least one corner which includes the cut and system edges, and wherein said imaging and scanning means comprises:

a pair of image converters each having a scanning direction orthogonal to the scanning direction of the other substantially parallel to the relevant edges in a respective field of vision; and an optic for imaging the corner of the chip on the image converters.

32. The apparatus of claim 31, and further comprising:

means for displacing one of said fields of vision along one side of the chip for scanning;

means for producing like further difference signals from the displaced field of vision; and means for comparing the further difference signals of one of said fields and said displaced field to obtain angle of rotation information.

33. The apparatus of claim 29, wherein the semiconductor element is a semiconductor chip having cut and system edges and at least one corner which includes the cut and system edges, and wherein said imaging and scanning means comprises:
- a single image converter for scanning the image substantially parallel to one of the edges; and
- an optical image rotation means for rotating the image for scanning substantially parallel to the other edge.

* * * * *